April 21, 1936.  L. E. LA BRIE  2,038,225

BRAKE

Original Filed Jan. 28, 1929

INVENTOR.
LUDGER E. LA BRIE
BY
ATTORNEY

Patented Apr. 21, 1936

2,038,225

UNITED STATES PATENT OFFICE 2,038,225

BRAKE

Ludger E. La Brie, South Bend, Ind., assignor to Bendix Brake Company, South Bend, Ind., a corporation of Illinois Original application January 28, 1929, Serial No. 335,433. Divided and this application September 30, 1933, Serial No. 691,616

5 Claims. (Cl. 188—78)

This invention relates to brakes, and is illustrated as embodied in an internal expanding automobile brake of the shiftable anchorage type. An object of the invention is to provide simple applying means for the brake, preferably arranged to have a reaction effect tending to equalize the torque of opposite brakes, and which is shown as arranged to act as an anchorage to take the torque of the brake.

In one desirable arrangement, the applying device includes a shaft arranged between the ends of the friction means, and having a bearing which serves as the brake anchorage, taking the torque of the brake. The shaft preferably has a lever arm rigidly fixed on its end and having pivoted thereto a novel floating cam lever. This cam lever is preferably arranged between the shaft bearing and one end of the friction means, so that in forward braking the torque of the brake is transmitted to the shaft bearing through the cam lever.

By this arrangement, an increase in the torque of the brake increases the friction between the cam lever and the anchorage, so that if the right front brake, for example, is doing more work than the left it will have a greater resistance to the application of additional applying pressure by the driver, thus having a tendency to equalize the torque of the opposite brakes.

Figure 1:
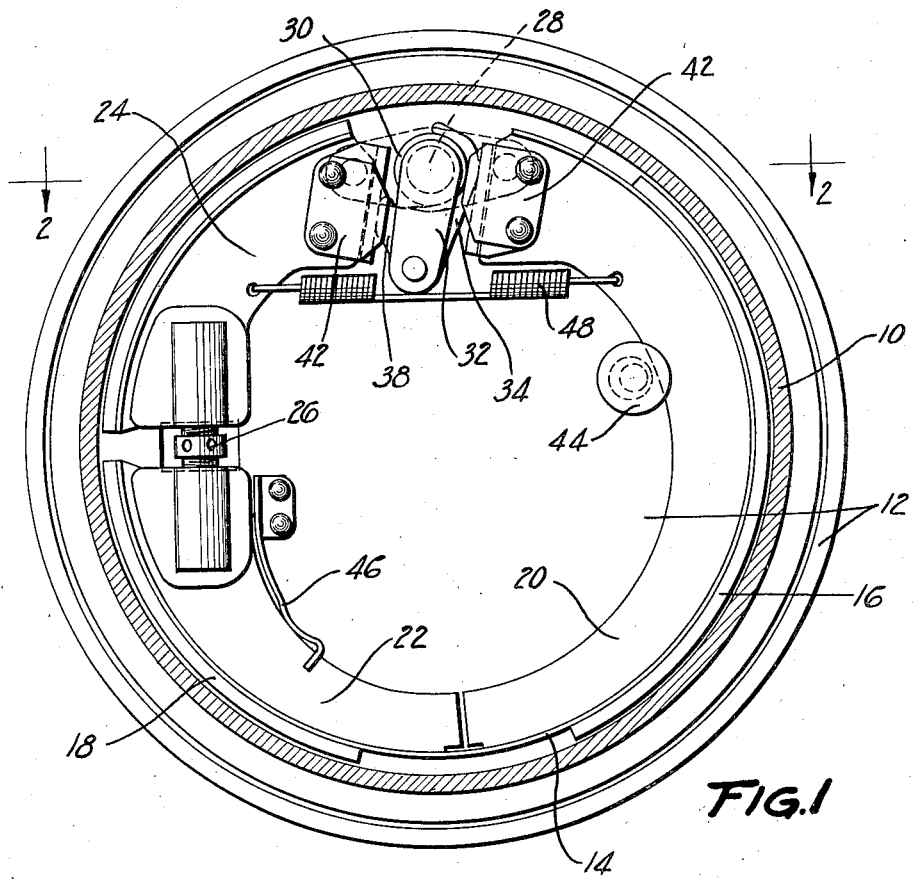
Figure 2:
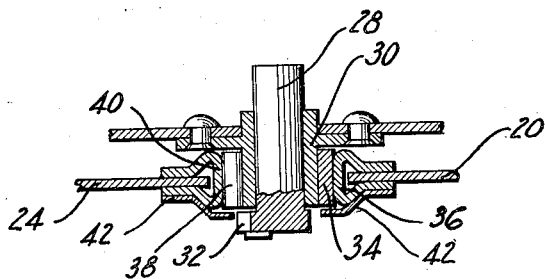

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the friction means in side elevation; and Figure 2 is a partial section through the novel applying and anchoring means, on the line 2—2 of Figure 1.

The brake selected for illustration includes a rotatable flanged drum 10, at the open side of which is a support such as a backing plate 12, and within which is arranged the friction means of the brake. The illustrated friction means comprises a rim 14, some 270 degrees long, carrying two segments 16 and 18 of brake lining and having integral therewith or welded or otherwise secured thereto two corresponding webs 20 and 22, shown as approximately 180 degrees and 90 degrees in length respectively.

Arranged end to end with the sectional shoe described above, there is shown a short T-section shoe 24, about 90 degrees long, rigidly and adjustably attached to web 22 by a right-and-left threaded member 26 threaded into corresponding threaded sockets formed at the ends of the shoes by welding pairs of grooved stampings to the ends of the shoe webs.

Between the ends of the floating shiftable-anchorage friction device so formed, there is arranged the shaft 28 of my novel applying means, the shaft being journaled in a bearing 30 riveted or otherwise secured to the backing plate and serving as the brake anchorage.

At the end of the shaft, just beyond the end of the bearing 30, there is formed or rigidly mounted a lever or arm 32 projecting inwardly generally radially toward the center of the brake. A novel cam lever 34 is pivoted at its inner end to the inner end of arm 32, being arranged on the same side of the arm as the shaft and extending upwardly paralleling the arm 32.

The cam 34 is recessed to fit around the bearing 30 and shaft 28, engaging a wear plate 36 on the end of the web 20 and having a projection 38 extending past the shaft and bearing and operatively engaging a wear plate 40 on the end of the shoe 24. When the drum is turning clockwise (as in reverse braking), the friction means anchors by engagement of the wear plate 40 with the bearing 30; when the drum is turning counter-clockwise (forward braking), the wear plate 36 anchors through the cam 34 on the bearing 30.

Stampings 42 may be secured to the sides of the wear plates 36 and 40 and arranged to project into engagement with the sides of the cam 34 to hold it laterally.

The idle position of the friction means may be determined in part by means such as a stop 44, shown as an adjustable grooved eccentric carried by the backing plate and engaging and embracing the edge of the web 20. A leaf spring 46 urges the web 20 against the stop, and cooperates with the main return spring 48.

While one illustrative embodiment has been described in detail, it is not my intention to limit the scope of the invention to that particular embodiment, or otherwise than by the terms of the appended claims. The present application is a division of my application No. 335,433, filed January 28, 1929.

I claim:

1. A brake-applying and torque-taking device comprising, in combination, a rotatable shaft having a bearing adapted to take the braking torque, an arm fixed on the shaft and projecting radially therefrom, and a floating cam pivoted to the end of the arm and extending beside the arm in the direction of the shaft and which has a portion on one side of the shaft adapted to engage a shoe on said side to apply it and formed to seat against the bearing to transmit braking torque from said shoe to the bearing and also having a portion projecting past the shaft and adapted to engage and apply a shoe on the other side of the shaft.

2. A brake-applying device comprising, in combination, a rotatable shaft having a bearing, an arm fixed on the shaft and projecting radially therefrom, and a floating cam pivoted to the end of the arm and extending beside the arm in the direction of the shaft and which is recessed making it substantially U-shaped to provide a portion on one side of the shaft formed to fit over the bearing and adapted to engage a shoe and the bearing on said side to apply the shoe, and to provide also a shorter portion projecting past the shaft and adapted to engage and apply only a shoe on the other side of the shaft.

3. A brake having friction means, a rotatable shaft having a bearing, and an applying device arranged to apply the friction means and which is operated by the shaft and which transmits to the shaft bearing the anchoring torque of the friction means.

4. A brake having floating shiftable-anchorage friction means, a rotatable shaft having a bearing, arranged between the ends of the friction means and serving as an anchor for said ends, and an applying device arranged to apply the friction means and which is operated by the shaft and which has a portion extending between the shaft and one of said ends and through which said one end transmits to the shaft bearing its anchoring torque.

5. A brake operating mechanism comprising a drilled boss forming a combination anchor and bearing, a shaft journaled in the boss and projecting therefrom, an arm attached to said shaft and projecting radially inwardly, and a floating U-shaped cam member pivoted at the bottom of the U on the end of the arm and having one leg partly surrounding the boss on one side adapted to transmit the braking torque from a brake shoe to the boss and a shorter leg on the other side of the boss adapted to engage and apply another brake shoe.

LUDGER E. LA BRIE.